US008266144B2

(12) United States Patent
Tankovich et al.

(10) Patent No.: US 8,266,144 B2
(45) Date of Patent: *Sep. 11, 2012

(54) TECHNIQUES TO PERFORM RELATIVE RANKING FOR SEARCH RESULTS

(75) Inventors: Vladimir Tankovich, Bellevue, WA (US); Dmitriy Meyerzon, Bellevue, WA (US); Michael Taylor, Redmond, WA (US); Stephen Robertson, London (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,043

(22) Filed: Jul. 1, 2011

(65) Prior Publication Data

US 2011/0264660 A1  Oct. 27, 2011

Related U.S. Application Data

(63) Continuation of application No. 12/051,847, filed on Mar. 20, 2008, now Pat. No. 7,974,974.

(51) Int. Cl.
*G06F 17/30* (2006.01)
(52) U.S. Cl. ............. 707/729; 707/722; 706/12; 706/14
(58) Field of Classification Search .................. None
See application file for complete search history.

(56) References Cited

U.S. PATENT DOCUMENTS

| | | | |
|---|---|---|---|
| 5,619,709 A | 4/1997 | Caid et al. | |
| 5,724,571 A | 3/1998 | Woods | |
| 5,757,983 A | 5/1998 | Kawaguchi et al. | |
| 5,761,497 A | 6/1998 | Holt et al. | |
| 5,771,378 A | 6/1998 | Holt et al. | |
| 5,870,740 A | 2/1999 | Rose et al. | |
| 5,893,092 A | 4/1999 | Driscoll | |
| 6,012,053 A * | 1/2000 | Pant et al. | 1/1 |
| 6,018,733 A | 1/2000 | Kirsch et al. | |
| 6,363,378 B1 * | 3/2002 | Conklin et al. | 1/1 |
| 6,370,525 B1 | 4/2002 | Kaufman | |
| 6,681,219 B2 | 1/2004 | Aref | |
| 6,738,764 B2 | 5/2004 | Mao et al. | |
| 6,859,800 B1 | 2/2005 | Roche et al. | |

(Continued)

OTHER PUBLICATIONS

Chirag Gupta, "Efficient K-Word Proximity Search", Department of Electrical Engineering and Computer Sicence, Case Western Reserve University, Jan. 2008.*

(Continued)

*Primary Examiner* — Apu Mofiz
*Assistant Examiner* — Hung Le
(74) *Attorney, Agent, or Firm* — Merchant & Gould P.C.

(57) ABSTRACT

Techniques to perform relative ranking for search results are described. An apparatus may include an enhanced search component operative to receive a search query and provide ranked search results responsive to the search query. The enhanced search component may comprise a resource search module operative to search for resources using multiple search terms from the search query, and output a set of resources having some or all of the search terms. The enhanced search component may also comprise a proximity generation module communicatively coupled to the resource search module, the proximity generation module operative to receive the set of resources, retrieve search term position information for each resource, and generate a proximity feature value based on the search term position information. The enhanced search component may further comprise a resource ranking module communicatively coupled to the resource search module and the proximity generation module, the resource ranking module to receive the proximity feature values, and rank the resources based in part on the proximity feature values. Other embodiments are described and claimed.

18 Claims, 7 Drawing Sheets

U.S. PATENT DOCUMENTS

| | | | |
|---|---|---|---|
| 6,947,920 B2 | 9/2005 | Alpha | |
| 7,143,085 B2 | 11/2006 | Brown et al. | |
| 7,433,893 B2 | 10/2008 | Lowry | |
| 7,716,216 B1 * | 5/2010 | Harik et al. | 707/724 |
| 7,761,447 B2 | 7/2010 | Brill et al. | |
| 2002/0143758 A1 * | 10/2002 | Aref | 707/4 |
| 2005/0198070 A1 * | 9/2005 | Lowry | 707/104.1 |
| 2006/0031212 A1 | 2/2006 | Edelmann et al. | |
| 2006/0224577 A1 | 10/2006 | Hullender et al. | |
| 2006/0253439 A1 | 11/2006 | Ren et al. | |
| 2006/0271524 A1 | 11/2006 | Tanne et al. | |
| 2007/0208701 A1 | 9/2007 | Sun et al. | |
| 2008/0082530 A1 | 4/2008 | Grabowski et al. | |
| 2008/0243820 A1 | 10/2008 | Chang et al. | |

OTHER PUBLICATIONS

Rasolofo et al, "Term Proximity Scoring for Keyword-Based Retrieval Systems", 2003.*

Buttcher, Stefan et al.; "Term Proximity Scoring for Ad-Hoc Retrieval on Very Large Text Collections", School of Computer Science; University of Waterloo; Canada; pp. 621-622, 2006.

Chakrabarti, Soumen et al.; "Optimizing Scoring Functions and Indexes for Proximity Search in Type-annotated Corpora"; IIT Bombay; 2006.

Goldman, Roy; "Proximity Search in Databases", Stanford University; pp. 1-24; 1998.

Sadakane, Kunihiko; "Fast Algorithm for k-word Proximity Search"; IEICE Trans. Fundamentals, vol. E84-A; pp. 312-319; 2001.

Clarke et al.; "Relevance Ranking for one to three term queries"; Information Processing Management 36; 2000.

Hawking et al.; "Proximity Operators—So Near and Yet So Far"; Co-operative Research Center for Advance Computational System; Australian National University; 1995.

Rasolofo et al.; "Term Proximity Scoring for Keyword-Based Retrieval Systems"; Universite de Neuchatel, Switzerland; 2003.

Beigbeder et al.; "An Information Retrieval Model Using the Fuzzy Proximity Degree of Term Occurrences"; ACM; 2005.

Monz, Christof; "Minimal Span Weighting Retrieval for Question Answering"; SIGIR 2004 Workshop.

Schenkel et al.; "Efficient Text Proximity Search"; Spriger-Verlag Berlin Heidelberg; 2007.

Gupta, Chirag; "Efficient K-Word Proximity Search"; Department of Electrical Engineering and Computer Science; Case Western Reserve; University; Jan. 2008; pp. 1-71.

Tao et al.; "An Exploration of Proximity Measures in Information Retrieval"; ACM; 2007.

Zhao et al.; "Adapting Document Ranking to Users' Preferences Using Click-through Data"; Proceedings of AIRS 2006; pp. 26-42.

Hu; "A Study on Question Answering System Using Integrated Retrieval Method"; Feb. 2006; pp. i-xiv, 1-112.

Knabe et al.; "Processing Search Queries in a Distributed Environment"; Conference on Information and Knowledge Management; Proceedings of the thirteenth ACM International conference on information and knowledge management; year of publication: 2004; pp. 492-494.

* cited by examiner

300

SEARCH FOR DOCUMENTS IN RESPONSE TO A SEARCH
QUERY WITH MULTIPLE SEARCH TERMS
302

RETRIEVE OCCURRENCE INFORMATION FOR EACH
DOCUMENT
304

GENERATE A PROXIMITY FEATURE VALUE BASED ON THE
OCCURRENCE INFORMATION
306

RANK THE DOCUMENTS BASED ON THE PROXIMITY
FEATURE VALUE
308

STORAGE MEDIUM 602

LOGIC 604

FIG. 6

TECHNIQUES TO PERFORM RELATIVE RANKING FOR SEARCH RESULTS

CROSS-REFERENCE TO RELATED APPLICATION

The present application is a continuation of Ser. No. 12/051,847 filed Mar. 20, 2008, now U.S. Pat. No. 7,974,974, issued on Jul. 5, 2011, which is hereby incorporated by reference in its entirety.

BACKGROUND

In the modern computing world, users routinely enter search requests into a variety of search engines to search for information on a given topic. An operator may enter search terms into a user interface for the search engine, such as a web browser, and the search engine may search and return a list of Universal Resource Locators (URL) associated with resources stored in various network accessible information sources, such as web servers for the Internet.

In response to such search requests, the search engine may return hundreds or even thousands of search results, including various URLs, documents or other resources. In an effort to organize search results for a user, techniques have been developed for ranking the search results and providing the search results to the user in the order of relevance to the given search request. Prior techniques have attempted to obtain various properties from located resources, such as metadata, and use those properties to determine a ranking of the relevance of individual resources to a search query. In many cases, however, metadata associated with various search results is incorrect or misleading. For example, incorrect data used by a ranking system leads to a poor ranking of the search results. Consequently, a user may be forced to review a number of irrelevant resources before the user comes to more relevant resources located by the search engine. Accordingly, there is a need for improved techniques for ranking search results for a search application with respect to these and other considerations.

SUMMARY

Various embodiments may be generally directed to search technologies. Some embodiments may be particularly directed to enhanced relevance ranking techniques suitable for search technologies. The enhanced relevance ranking techniques may allow search applications to fully or partially rank search results based on search term position information and a proximity feature value derived from the search term position information.

In one embodiment, for example, an apparatus may include an enhanced search component operative to receive a search query and provide ranked search results responsive to the search query. The enhanced search component may comprise, among other elements, a resource search module operative to search for resources using multiple search terms from the search query, and output a set of resources having some or all of the search terms. The enhanced search component may also comprise a proximity generation module communicatively coupled to the resource search module, the proximity generation module operative to receive the set of resources, retrieve search term position information for each resource, and generate a proximity feature value based on the search term position information. The enhanced search component may further comprise a resource ranking module communicatively coupled to the resource search module and the proximity generation module, the resource ranking module to receive the proximity feature values, and rank the resources based in part on the proximity feature values. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 illustrates an embodiment of a first logic flow.

FIG. 6 illustrates an embodiment of an article.

DETAILED DESCRIPTION

Figure 1:
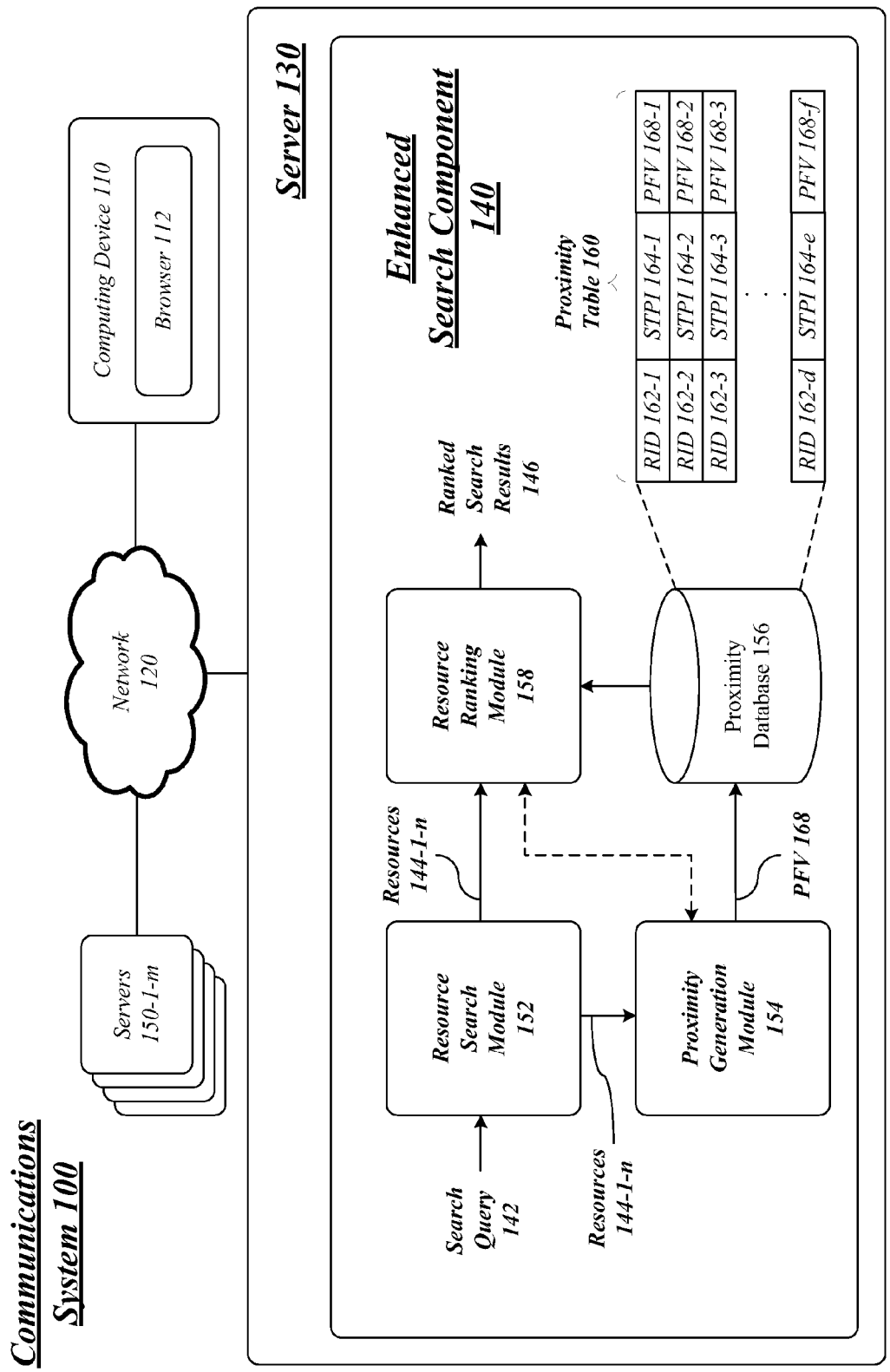
FIG. 1 illustrates an embodiment of a communications system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are generally directed to search systems. Search systems may implement various search techniques to search, retrieve, score, rank, display, and perform other search operations designed to provide search results in response to a search query. The search results may include, for example, a list of resources derived from various information sources. In some cases, the information sources may reside on a single device, such as resources in a file system for a personal computer. In other cases, the information sources may reside on multiple devices, such as resources in network servers accessible via a communications network. In both cases, a search application may receive a search query having multiple search terms, search for resources such as documents or web pages that have some or all of the search terms, and return a list of resources or resource identifiers matching the search query.

The search application may also implement a relevance ranking algorithm to present the list of resources in a predetermined order from most relevant resource to least relevant resource. A relevance ranking algorithm evaluates each item in a data collection in such a way that any two items can then be compared to see which should come higher in the ranking In mathematical terms, this is known as a weak order or total preorder of objects. By reducing detailed measures to a sequence of ordinal numbers, rankings make it possible to evaluate complex information according to certain criteria. Thus, for example, an Internet search engine may rank the web pages it finds according to an evaluation of their relevance, making it possible for the user to quickly select the pages they likely want to see.

Various embodiments are directed to enhanced relevance ranking techniques suitable for search technologies, such as search applications, search engines or information retrieval systems (collectively referred to herein as "search applications"). The enhanced relevance ranking techniques may allow search applications to fully or partially rank search results based on search term position information and proximity feature values derived from the search term position information. The proximity feature values provide improved relevance for search queries which contain more than one word (e.g., Microsoft® Office). This is based on the premise that when the query terms are proximate or closer together in a given resource X, then the resource X is a better match for the search query than another resource Y where the search terms are further apart. For example, if the search query was "Microsoft Office," then the resource X having content where the word "Microsoft" is closer to the word "Office" would be given a higher relevance ranking than the resource Y having content where the word "Microsoft" was further from the word "Office." By way of contrast, conventional ranking techniques typically weight these two resources identically. In this manner, the enhanced relevance ranking techniques may allow search applications to provide a search result having a list of resources with relevant resources ranked higher than irrelevant resources. As a result, the enhanced relevance ranking techniques can improve affordability, scalability, modularity, extendibility, or interoperability for an operator, device or network.

FIG. 1 illustrates a block diagram for a search system 100. The search system 100 may comprise various elements designed for a singular computing architecture comprising a single electronic device, such as a desktop environment. Alternatively or additionally, the search system 100 may comprise various elements designed for a distributed computing architecture comprising multiple electronic devices, such as a network or web-eased environment. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although the search system 100 as shown in FIG. 1 has a limited number of elements in a certain topology, it may be appreciated that the search system 100 may include more or less elements in alternate topologies as desired for a given implementation. The embodiments are not limited in this context.

As used herein the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In various embodiments, the search system 100 may comprise, or form part of, a wired communications system, a wireless communications system, or a combination of both. For example, the search system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The search system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In the illustrated embodiment shown in FIG. 1, a computing device 110 may connect to a server 130 over one or more communications connections via a network 120. The server 130 may comprise any logical or physical entity that is arranged to interoperate with the computing device 110 to perform search management operations. The server 130 and the computing device 110 may communicate search information over a network 120. Network 120 may comprise, for example, a packet-switched network, a circuit-switched network, or a combination of both. In various embodiments, the server 130 may comprise or be implemented as any processing or computing device, such as a computer, a server, a server array or server farm, a work station, a mini-computer, a main frame computer, a supercomputer, and so forth. The server 130 may comprise or implement a general or specific computing architecture suitable for communicating and processing multimedia information. In some implementations, the server 130 may be implemented using a general or specific computing architecture similar to the computing architecture described with reference to FIG. 5. Examples for the server 130 may include without limitation a network server, a web server, an Internet server, and so forth.

In various embodiments, the search system 100 may include one or more computing devices 110. The computing device 110 may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of the computing device 110 may include a mobile device, a personal digital assistant (PDA), a combination cellular telephone and PDA, a mobile computing device, a smart phone, a cellular telephone, a one-way pager, a two-way pager, a messaging device, a computer, a personal computer (PC), a desktop computer, a laptop computer, a notebook computer, a handheld computer, a server, a work station, a mini-computer, a main-frame computer, a network appliance, a web appliance, and so forth. In some implementations, the computing device 110 may be implemented using a general or specific computing architecture similar to the computing architecture described with reference to FIG. 5.

The server 130 and/or the computing device 110 may include, among other elements, an enhanced search component 140. The enhanced search component 140 may comprise part of another application program, such as MICROSOFT WINDOWS® SEARCH COMPANION, MICROSOFT WINDOWS LIVE SEARCH, MICROSOFT MSN SEARCH, MICROSOFT LIVE SEARCH, WINDOWS DESKTOP SEARCH, and SHAREPOINT® SERVER SEARCH, all made by Microsoft Corporation, Redmond, Wash. The enhanced search component 140 may also comprise a standalone application program accessible to other application programs via a set of application program interfaces (APIs) or other interface.

At a very high level of abstraction, the enhanced search component 140 is used by a user to locate documents follows a process comprising three steps: searching for candidate documents; ranking the candidate documents; and displaying the ranked documents to the user.

Searching typically involves obtaining a set of keywords from the user to direct the search and then identifying all documents within the search domain which match those keywords. In attempting to match the keywords, the search engine may compare the keywords to a variety of document attributes (e.g., title, body, etc), document metadata, or metadata about the candidate document maintained in another document (e.g., anchor text on hyperlinks to the candidate). The resulting set of candidate documents contains all documents from the search domain which may be relevant. Clearly, some are more likely to be relevant than others.

Ranking the candidate documents attempts to predict the relevance of the documents to the user. This is done by applying a ranking function to one or more characteristics, or ranking features, of the candidate documents to obtain a score for each document. The candidate documents are then ordered by their score in decreasing order of predicted relevance.

Following ranking, the ordered candidate documents are then presented to the user starting with the most relevant. Typically, the list is presented in relatively small groups, such as 10 or 20 at a time. Because of a natural tendency for the user to only review a small number of these groups, it is important that the user find what they consider to be the most relevant documents within this small subset of the candidate documents. User satisfaction with a search engine is thus critically dependent upon the predicted relevance calculated by the ranking function matching the user's perceived relevance so that the user finds what they want as easily as possible. The enhanced search component 140 may improve ranking the candidate documents, among other benefits and advantages.

In the illustrated embodiment shown in FIG. 1, the enhanced search component 140 may generally be arranged to receive a search query 142, and provide a set of ranked search results 146 responsive to the search query 142. The ranked search results 146 may include, for example, a list of resources derived from various information sources. The resources may comprise any searchable media content, including text files, audio files, video files, images, pictures, application files, documents, web pages, hypertext markup language (HTML) files, extensible markup language (XML) files, and any other discrete set of electronic information capable of storage by various types of computer-readable media. The embodiments are not limited in this context.

In some cases, the information sources may reside on a single device, such as resources in a file system for the computing device 110. In this case, the enhanced search component 140 may be implemented as part of a desktop search application, such as MICROSOFT WINDOWS SEARCH COMPANION, WINDOWS DESKTOP SEARCH, GOOGLE® DESKTOP, YAHOO!® DESKTOP, and similar desktop search applications.

In other cases, the information sources may reside on multiple devices, such as resources stored by network servers 150-1-$m$ accessible via the network 120. In this case, the enhanced search component 140 may be implemented as part of a network search application, such as one or more servers 130 implementing server based search applications, such as MICROSOFT WINDOWS LIVE SEARCH, MICROSOFT MSN SEARCH, MICROSOFT LIVE SEARCH, GOOGLE, YAHOO!, and similar network search applications.

In both the desktop search application and the network search application environment, the enhanced search component 140 may receive the search query 142 having multiple search terms, search for resources such as documents or web pages that have some or all of the search terms from the search query 142, and return a set of ranked search results 146 comprising a list of resources or resource identifiers matching the search query 142. The ranked search results 146 may order the resources or resource identifiers from a most relevant resource to a least relevant resource. In this manner, the most relevant resources may be at the top of the ranked search results 146 thereby allowing the operator that submitted the search query 142 to view the more relevant search results faster.

The enhanced search component 140 may comprise, among other elements, a resource search module 152. The resource search module 152 may be arranged to search for resources using multiple search terms from the search query 142, and output a set of resources 144-1-$n$ having some or all of the search terms. The search query 142 may be generated, for example, by an operator of the computing device 110 via the web browser 112. The resource search module 152 may implement various search applications or search engines. In one embodiment, for example, the resource search module 152 may comprise part of a web search engine.

Web search engines work by storing information about a large number of web pages, which they retrieve from the World Wide Web (WWW) itself. The web pages are retrieved by a web crawler (sometimes also known as a web spider, web robot, web scutter, and so forth), which is an automated web browser which follows every link it sees. The contents of each page are then analyzed to determine how it should be indexed. For example, words are extracted from the titles, headings, or special fields called metatags of each page. Data about web pages are stored in an index database for use in later queries. Some search engines store all or part of the source page (referred to as a cache) as well as information about the web pages, whereas others store every word of every page they find. This cached page always holds the actual search text since it is the one that was actually indexed, so it can be very useful when the content of the current page has been updated and the search terms are no longer in it.

In general operation, the document search module 152 receives the search query 152 from the web browser 112 of the computing device 110, and parses the search query 152 for search terms (e.g., key words) and any Boolean operators or other search constraints. The document search module 152 employs a network search application to search for various network resources (or desktop resources in the desktop search application implementation). For example, the document search module 152 may perform a live or real-time search for resources stored by the various network servers 150-1-$m$ via the network 120. Additionally or alternatively, the document search module 152 may search a cache or index of resources created using a web crawler and stored by a mass storage device accessible to the server 130.

When an operator enters a search query 142 into a search engine, typically by using key words, the search engine examines its index and provides a listing of best-matching web pages according to its criteria, usually with a short summary containing the page title and sometimes parts of the text. Most search engines support the use of the Boolean operators AND, OR and NOT to further specify the search query 142. Some search engines provide an advanced feature called proximity search which allows users to define the distance between keywords. The document search module 152 performs search operations, and then outputs a set of resources 144-1-$n$ matching some or all of the search terms and criteria for the search query 142.

The usefulness of a given search engine depends on the relevance of the result set it gives back. While there may be millions of web pages that include a particular word or phrase, some pages may be more relevant, popular, or authoritative than others. Most search engines therefore employ some form of a relevance ranking technique to rank the results to provide the "best" results first. How a search engine decides which pages are the best matches, and what order the results should be shown in, varies widely from one engine to another.

Various embodiments implement enhanced relevance ranking techniques that allow search applications to fully or partially rank search results based on search term position information. The search term position information provides improved relevance for search queries which contain more than one word (e.g., Microsoft Office). This is based on the premise that when the query terms are proximate or closer together in resource X, then resource X is a better match for the search query than another resource Y where the search terms are further apart. For example, if the search query was "Microsoft Office," then the resource X having content where the word "Microsoft" is closer to the word "Office" would be given a higher relevance ranking than the resource Y having content where the word "Microsoft" was further from the word "Office."

To implement the enhanced relevance ranking techniques, the enhanced search component 140 may comprise a proximity generation module 154 communicatively coupled to the resource search module 152. The proximity generation module 154 may be arranged to receive the set of resources 144-1-$n$ from the document search module 152. The proximity generation module 154 may retrieve search term position information for each of the resources 144-1-$n$, and generate a proximity feature value (PFV) 168 based on the search term position information.

The proximity generation module 154 may retrieve search term position information for each of the resources 144-1-$n$. The search term position information may represent a position for each of the multiple search terms from the search query 142 within a single resource 144-1-$n$. A given resource 144-1-$n$, such as a document, is typically a sequence of terms from 1 to N. As such, the position of each term may be precisely determined based on where the term falls within the sequence of terms from 1-N. For example, a web page for Microsoft Office might have the word "Microsoft" in position 10 and Office in position 11, thereby indicating that the words are next to each other in the word sequence from 1-N.

In some cases, the proximity generation module 154 may retrieve the search term position information for each resource 144-1-$n$ from a proximity database 156. The proximity database 156 may include a proximity table 160. The proximity table 160 may include, among other information, search term position information 164-1-$e$ corresponding to various resource identifiers 162-1-$d$. The search term position information 164-1-$e$ may be generated a priori to receiving the search query 142. For example, the search term position information 164-1-$e$ may be generated by a web crawler on a continuous or on-going basis as it crawls around the WWW (e.g., the network servers 150-1-$m$). When the web crawler discovers a new resource 144-1-$n$, the web crawler may process and extract the search term position information 164-1-$e$ from each resource 144-1-$n$ to retrieve the search term position information 164-1-$e$, and store the search term position information 164-1-$e$ with the appropriate resource identifier 162-1-$d$ in the proximity table 160. This technique has the advantage of decreasing the time needed to return a set of rank search results 146 in response to a given search query 142, at the cost of increasing processing resources needed to scan and index all the terms within a given resource 144-1-$n$.

Additionally or alternatively, the document search module 152 and/or the proximity generation module 154 may scan the resources 144-1-$n$, and extract the search term position information 164-1-$e$ from each resource 144-1-$n$ to retrieve the search term position information 164-1-$e$ in response to a given search query 142. This technique has the advantage of reducing processing costs associated with indexing a given resource 144-1-$n$ relative to using a web crawler, since search term position information 164-1-$e$ is needed for only the specific search terms within the search query 142. Given the large number of resources 144-1-$n$ that might be suitable for the search query 142, however, this technique may introduce a significant amount of delay in returning the rank search results 146 in response to the search query 142. A multistage ranking technique may be used to reduce this delay to acceptable performance levels, as described in more detail later.

The proximity generation module 154 may retrieve search term position information for each of the resources 144-1-$n$, and generate a proximity feature value 168-1-$f$ based on the search term position information 164-1-$e$. The proximity feature values 168-1-$f$ may represent, among other information, an approximate distance between positions for two or more of the search terms within a single resource 144-1-$n$. The proximity generation module 154 generates the proximity feature values 168-1-$f$ using a proximity algorithm. The proximity algorithm may take as input the search term position information 164-1-$e$ for a given resource 144-1-$n$, and identifies one or more data chunks or data spans of the resource 144-1-*n* that has some or all of the search terms for the search query 142. The proximity algorithm then utilizes an unordered cost function or an ordered cost function to calculate a proximity feature value 168-1-*f* for a given resource 144-1-*n*.

By way of example and not limitation, assume an exemplary proximity algorithm has the following definitions:
qN=number of query terms;
Q1 . . . QqN=arrays with positional information for corresponding query term, with ascending sort by position;
PosCount=sum of sizes of Q1 . . . QqN. Number of positions.
Tpos=array of size PosCount that contains positions for query terms
Tid=array of size PosCount that contain Id of term(1 . . . qN) which position is stored in Tpos A set of example values for each of the above variables may be as follows:
qN=3;
Q1={1, 10, 15};
Q2={2, 8, 13};
Q3={45}; and
PosCount=7.

Using these example values, the results for Tpos and Tid would comprise the following:
Tpos={1, 2, 8, 10, 13, 15, 45};
Tid={1, 2, 2, 1, 2, 1, 3};

The Tpos and Tid arrays containing the search term position information may now be ready for use as input data for various cost functions used to derive the proximity feature values 168-1-*f*.

Once the search term position information is prepared as input data, the proximity generation module 154 may use a proximity algorithm to identify a chunk in each resource 144-1-*n* that maximizes a given cost function. In one embodiment, for example, the proximity generation module 154 may utilize a proximity algorithm that implements an unordered cost function. An unordered cost function may refer to a cost function that does not require search terms present in a given chunk to be in the same order as in the search query 142. An example of an unordered cost function is shown as follows as Equation (1):

$$F(chunk_{properties}) = \sqrt[a]{\frac{NumberofDifferentTermsInChunk}{chunk_{length}}} * \left(\frac{NumberofDifferentTermsInChunk}{NumberofTermsInQuery}\right)^b \quad \text{Equation (1)}$$

where a and b are parameters to be tuned for a given implementation.

An unordered cost function as illustrated in Equation (1) is selected to have the following properties: (1) shorter chunks have a higher value; (2) chunks that include more query terms have a higher value; and (3) when two chunks for different search queries have the same length and include the same number of different search terms, the chunk for the shorter query will have a higher value. For the previous example given above, the shortest chunk that includes all terms is [13, 45] with a length 45−13+1=33. The shortest chunk [13, 45] may therefore be a candidate for a higher proximity feature value 168-1-*f*. The shortest chunk with all the search terms for a given search query 142, however, does not necessarily have a higher proximity feature value 168-1-*f* in all cases. Depending on a particular cost function calculation, for example, the chunk [1, 2] might have a better value even though it does not include all the search terms since it has a substantially shorter length (e.g., 2−1+1=2) than the chunk [13, 45] (e.g., 45−13+1=33).

An exemplary proximity algorithm suitable for use by the proximity generation module 154 using the unordered cost function shown in Equation (1) may be illustrated using the following pseudo-code:

```
TermCounts[1... qN] // array that stores number of different terms in current span
BestVal = 0 // result
MaxSpan = Tpos[PosCount] − Tpos[1] + 1 //maximum length of span that will improve BestVal
For CurTermNum = QueryTermCount downto 2
    termOccCount[1...QueryTermCount ] = {0...0}//occurrence of each term
    CurTermCount = 0
    Startpos = 0
      Bestspan = MaxSpan + 1
      For endpos = 0 to PosCount
        ++termOccCount[termid[endpos]]
        if termOccCount[termid[endpos]] = 1 then ++ CurTermCount
        while Tpos[endpos] − Tpos[startpos] > MaxSpan
          −−termOccCount[termid[startpos]]
          if termOccCount[termid[startpos]] = 0 then −−furTermCount
          ++startpos
        end
        while CurTermCount >= CurTermNum
          if (Tpos[endpos] − Tpos[startpos] < bestspan)
            bestspan = Tpos[endpos] − Tpos[startpos]
          end;
          −−termOccCount[termid[startpos]]
          if termOccCount[termid[startpos]] = 0 then −−furTermCount
          ++startpos
        end
      end
      if (bestspan <= maxspan)
```

$$BestVal = \sqrt[2]{\frac{CurTermNum}{bestspan}} * \left(\frac{CurTermNum}{QueryTermCount}\right)^2$$

-continued $$\text{MaxSpan} = \frac{(\text{CurTermNum} - 1)^5}{\text{newval}^2 * \text{QueryTermCount}^4}$$

end
end

It may be appreciated that not all multiword search queries are expected to be found adjacently in resources 144-1-$n$. For example, a search query 142 with the search terms "SysCal promotions" should match multiple resources 144-1-$n$ entitled "SysCal Server 2007 promotions" and "promotions for the SysCal Server range." For this reason, some embodiments may use a separate version of the proximity algorithm that requires query-keyword matches in the same order in the resource 144-1-$n$ as found in the search query 142.

To implement this feature, the proximity generation module 154 may identify a chunk in each resource 144-1-$n$ that maximizes an ordered cost function. An ordered cost function may refer to a cost function that does require search terms present in a given chunk to be in the same order as in the search query 142. An example of an ordered cost function is shown as follows as Equation (2):

$$F(\text{chunk}_{properties}) = \frac{\text{NumberofDifferentTermsInChunk}}{\text{chunk}_{length} * \text{NumberofTermsInQuery}} + \frac{\text{NumberofDifferentTermsInChunk} - 1}{\text{NumberofTermsInQuery}} \quad \text{Equation (2)}$$

An exemplary proximity algorithm suitable for use by the proximity generation module 154 using the ordered cost function shown in Equation (2) may be illustrated using the following pseudo-code:

```
BestVal = 0 // result
Curchunkpos = 0 // the start pos of current chunk
Curchunkterms = 0 // how many different query terms we got in chunk
Lastterm = qN + 1 //more than number of different terms in query
For pos = 0 to PosCount
    If Tid[pos] > Lastterm
        // can continue current chunk
        ++Curchunkterms
        Lastterm = Tid[pos]
    Else
        Curchunkterms = 1
        Curchunkpos = Tpos[pos]
        Lastterm = Tid[pos]
    If pos > 0
        newval = F(Curchunkterms, Tpos[pos - 1] - Curchunkpos)
F(NumberOfDifferentTermsInChunk, Chunk_{length})
            if newval > bestval then bestVal = newval
        end
    end
end
```

As illustrated above, a position for each search term in a search query 142 is known from the corresponding value stored in the Tid array. The proximity generation module 154 attempts to identify chunks that are formed by an increasing sequence of query term identifiers. It may be appreciated that the proximity algorithm is not necessarily designed to identify a chunk that maximizes cost for any given set of data. Rather, it should give a sufficiently close result on a typical data set.

The proximity generation module 154 may generate a set of proximity feature values 168-1-$f$ for a set of resources 144-1-$n$ in response to a search query 142. The proximity generation module 154 may store the proximity feature values 168-1-$f$ indexed by the corresponding resource identifier 162-1-$d$ in the proximity table 160 of the proximity database 156. Additionally or alternatively, the proximity generation module 154 may pass the proximity feature values 168-1-$f$ directly to a resource ranking module 158.

The enhanced search component 140 may further comprise a resource ranking module 158 communicatively coupled to the resource search module 152 and the proximity generation module 154. The resource ranking module 158 may be arranged to receive the proximity feature values 168-1-$f$ from the proximity generation module 154 and/or the proximity database 156, and use the proximity feature values 168-1-$f$ to rank the resources 144-1-$n$.

The resource ranking module 158 may implement a relevance ranking algorithm to present the list of resources in a predetermined order. As previously described, a relevance ranking algorithm evaluates each item in a data collection in such a way that any two items can then be compared to see which should come higher in the ranking By reducing detailed measures to a sequence of ordinal numbers, rankings make it possible to evaluate complex information according to certain criteria. Thus, for example, the enhanced search component 140 may rank the resources 144-1-$n$ it finds according to an evaluation of their relevance, making it possible for the user to quickly select the resources 144-1-$n$ they likely want to see.

In one embodiment, for example, the resource ranking module 158 may utilize a relevance ranking algorithm designed as a neural network algorithm. A neural network is an interconnected group of artificial neurons that uses a mathematical or computational model for information processing based on a connectionist approach to computation. In most cases a neural network is an adaptive system that changes its structure based on external or internal information that flows through the network. The neural networks are typically non-linear statistical data modeling or decision making tools. They can be used to model complex relationships between inputs and outputs or to find patterns in data. An example of a neural network algorithm suitable for resource ranking module 158 may be described with reference to FIG. 7.

In general operation, the resource ranking module 158 may receive the list or resources 144-1-$n$ from the resource search module 152, and the proximity feature values 168-1-$f$ from the proximity table 160. The resource ranking module 158 may then use the proximity feature values 168-1-$f$, and any other known ranking criteria, to rank the list of resources 144-1-$n$ from most relevant to least relevant resources 144-1-$n$, with the most relevant resources 144-1-$n$ at the top of the list. Without considering other ranking criteria, the resource ranking module 158 utilizes an enhanced relevance ranking algorithm generally designed to rank those resources 144-1-$n$ having a higher proximity feature value 168-1-$f$ above those resources 144-1-$n$ having a lower proximity feature value 168-1-f. Once the resource ranking module 158 processes the resources 144-1-n and completes the ranking, the resource ranking module 158 outputs the ranked search results 146. The server 130 may then send the ranked search results 146 to the computing device 110 for display by the web browser 112.

In some cases, the enhanced search component 140 may need to process a relatively large number of resources 144-1-n for a given search query 142-1-m. In some edge cases, this number may be on the order of millions of resources 144-1-n. Consequently, it may not be feasible to extract search term position information 164-1-e for such a large number of resources 144-1-n and remain within a given set of performance constraints. In such cases, the resources 144-1-n may be processed in multiple stages. For example, the enhanced search component 140 may utilize a two-stage ranking technique, where the first stage uses a less computationally expensive ranking technique to perform an initial ranking of resources 144-1-n, and the second stage uses a more computationally expensive ranking technique to perform a refined ranking of some or all of the resources 144-1-n.

In one embodiment, for example, the resource ranking module 158 may be operative to rank the resources 144-1-n using multiple ranking algorithms. The first ranking algorithm may be arranged to rank the resources 144-1-n using a first set of ranking criteria to form a first set of ranked resources. The second ranking algorithm may be arranged to rank a subset of the first set of ranked resources using a second set of ranking criteria that may include, among other criteria, the proximity feature values 168-1-f to form a second set of ranked resources. In this manner, the first ranking algorithm may be used to perform an initial ranking, and then a certain number of resources 144-1-n that are of higher rank (e.g., top 1000) may be processed using the second ranking algorithm and the proximity feature values 168-1-f. As a result, the speed and probability of ranking relevant resources 144-1-n higher in the rank search results 146 for an operator may increase accordingly.

Figure 2:
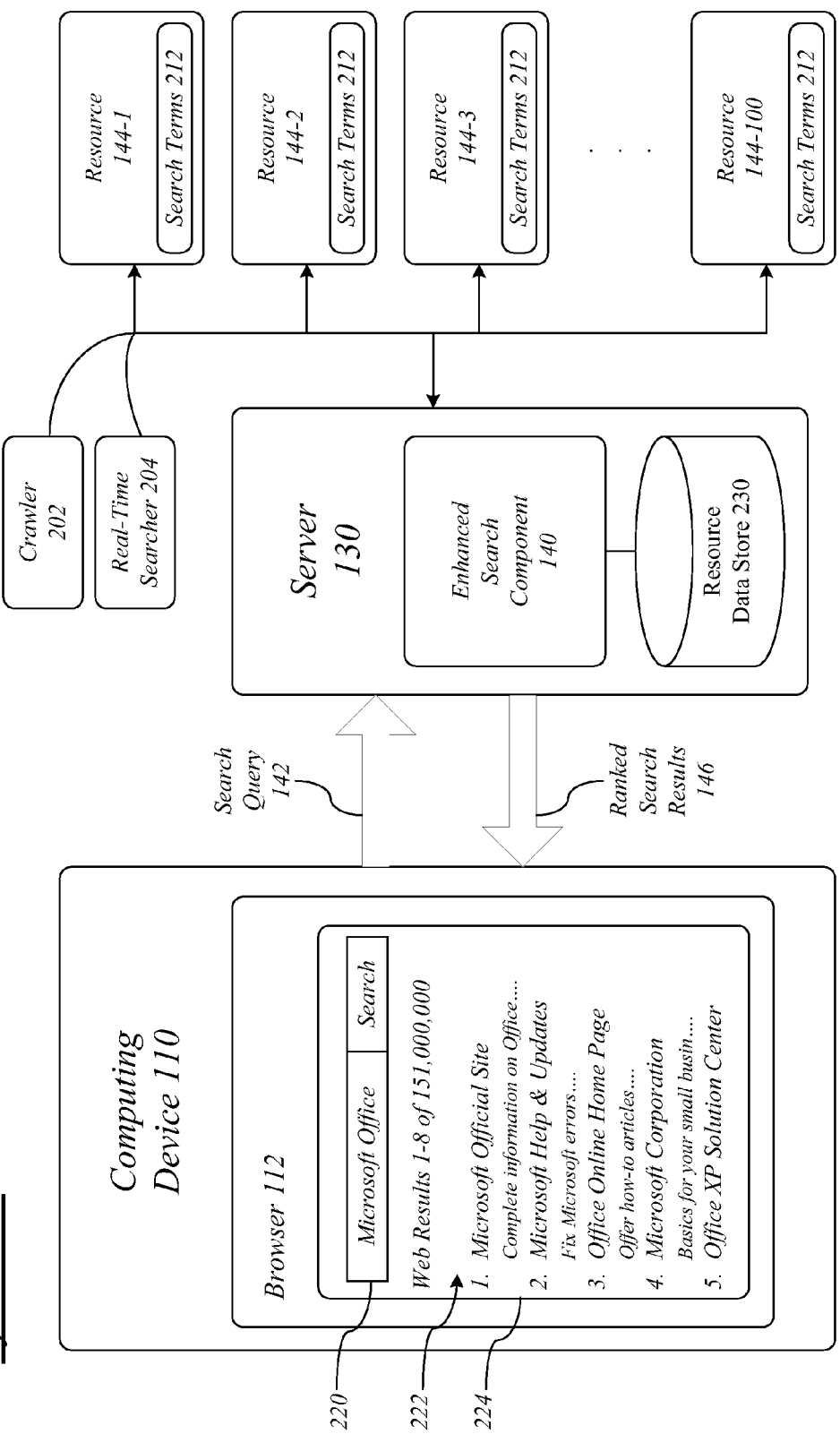
FIG. 2 illustrates an embodiment of the communications system.

FIG. 2 illustrates a more detailed block diagram of the search system 100. In the illustrated embodiment shown in FIG. 2, an operator may enter a search query 142 into a graphical user interface (GUI) area 220 of a GUI view 224 displayed by the browser 112 of the computing device 110. The computing device 110 may communicate the search query 142 to the server 130. The enhanced search component 140 may receive the search query 142, and begin processing the search query 142 to retrieve resources 144-1 through 144-100 having search terms 212 matching the search terms 212 for the search query 142. The enhanced search component 140 may retrieve the resources 144-1 through 144-100 using a web crawler 202 or real-time searcher 204. For example, the web crawler 202 may have harvested and stored the resources 144-1 through 144-100 in a resource data store 230 prior to the enhanced search component 140 receiving the search query 142. In this case, the enhanced search component 140 may retrieve the resources 144-1 through 144-100 from the resource data store 230. In another example, the real-time searcher 204 may search for the resources 144-1 through 144-100 subsequent to the enhanced search component 140 receiving the search query 142. The real-time searcher 204 may then store the found resources 144-1 through 144-100 in the resource data store 230, or forward directly to the enhanced search component 140 for processing.

Once the enhanced search component 140 retrieves the resources 144-1 through 144-100, it processes the resources 144-1 through 144-100 as previously described to generate the ranked search results 146. The server 130 may send the ranked search results 146 to the computing device 110. The computing device 110 may then display the ranked search results in the GUI area 222 of the browser 112.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 3 illustrates one embodiment of a logic flow 300. The logic flow 300 may be representative of some or all of the operations executed by one or more embodiments described herein.

As shown in FIG. 3, the logic flow 300 may search for resources in response to a search query with multiple search terms at block 302. For example, the resource search module 152 of the enhanced search component 140 may search for resources 144-1-n in response to a search query 142 with multiple search terms 212. The resource search module 152 may search the resource data store 230 for the resources 144-1-n as previously harvested by the web crawler 202, or the network servers 150-1-m using the real-time searcher 204.

The logic flow 300 may retrieve search term position information for each resource at block 304. For example, the proximity generation module 154 may retrieve search term position information 164-1-e for each resource 144-1-n. The proximity generation module 154 may retrieve the search term position information 164-1-e from the proximity table 160 of the proximity database 156 if the resources 144-1-n were previously processed to extract the search term position information 164-1-e. Alternatively, the proximity generation module 154 may process the resources 144-1-n to retrieve the search term position information 164-1-e directly from the resources 144-1-n.

The logic flow 300 may generate a proximity feature value based on the search term position information at block 306. For example, the proximity generation module 154 may generate the proximity feature values 168-1-f using the search term position information 164-1-e. The proximity generation module 154 may implement a proximity algorithm using an unordered cost function as shown in Equation (1) or an ordered cost function as shown in Equation (2) to generate the proximity features values 168-1-f.

The logic flow 300 may rank the resources based on the proximity feature value at block 308. For example, the resource ranking module 158 may rank the resources 144-1-n based at least in part on the proximity feature values 168-1-f. The resource ranking module 158 may utilize a single ranking stage technique or a multiple ranking stage technique depending upon a given set of design parameters and performance constraints. An exemplary logic flow for a multiple ranking stage technique may be described in more detail with reference to FIG. 4.

Figure 4:
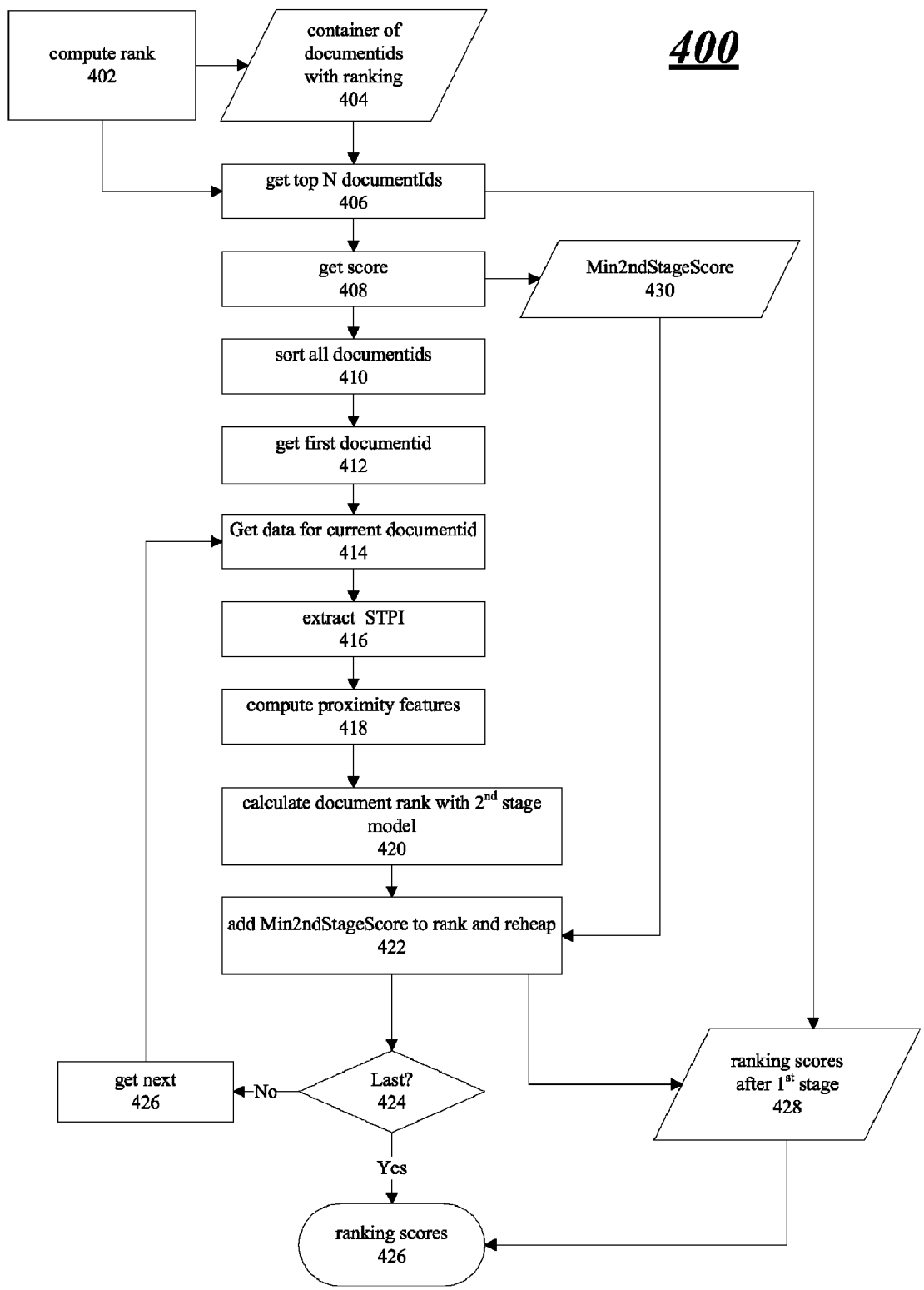
FIG. 4 illustrates an embodiment of a second logic flow.

FIG. 4 illustrates one embodiment of a logic flow 400. The logic flow 400 may be representative of some or all of the operations executed by one or more embodiments described herein. More particularly, the logic flow 400 may provide a more detailed logic flow for implementing multiple ranking stages.

In the illustrated embodiment shown in FIG. 4, the logic flow 400 may compute a rank using a first ranking stage for each resource identifier (RID) 162-1-d that satisfies the requirements for the search query 142 at block 402. The logic flow 400 may create a container of RID 162-1-d with ranking scores after the first ranking stage sorted by ranking score at block 404. The logic flow 400 may get the top N RID 162-1-d at block 406. The logic flow 400 may get a ranking score for a RID 162-1-d at the Nth place at block 408. The logic flow 400 may calculate a minimum second ranking stage score at block 430, and pass the minimum second ranking stage score to block 422.

The logic flow 400 may sort all RID 162-1-d in ascending order by RID 162-1-d at block 410. The logic flow 400 may get the first RID 162-1 at block 412. The logic flow 400 may get data for the RID 162-1 at block 414, and extract search term proximity information 164-1 for the RID 162-1 at block 416. The operations at block 414, 416 may be combined in some instances. The logic flow 400 may then compute the proximity feature value 168-1 for the RID 162-1 using the search term proximity information 164-1 at block 418.

The logic flow 400 may calculate a second stage rank score using a second ranking stage at block 420, and add the minimum second stage score received from block 430 to the second stage rank score to form a combined second stage rank score, and reheap at block 422. A decision whether a lost top N RID 162-1-d has been processed is made at diamond 424, and if not, the next RID 162-1-d (e.g., RID 162-2) of the top N RID 162-1-d is retrieved at block 426, and processed via the blocks 414 through 424. This continues until the last of the top N RID 162-1-d has been processed.

The logic flow 400 may pass the combined second stage rank score to the block 428, where it is added to a heap of RID 162-1-d with first stage ranking scores calculated after the first ranking stage without the top N documents processed using the second ranking stage. Once the last of the top N RID 162-1-d has been processed, a final ranking score is assigned at block 426 to form the ranked search results 146.

Figure 5:
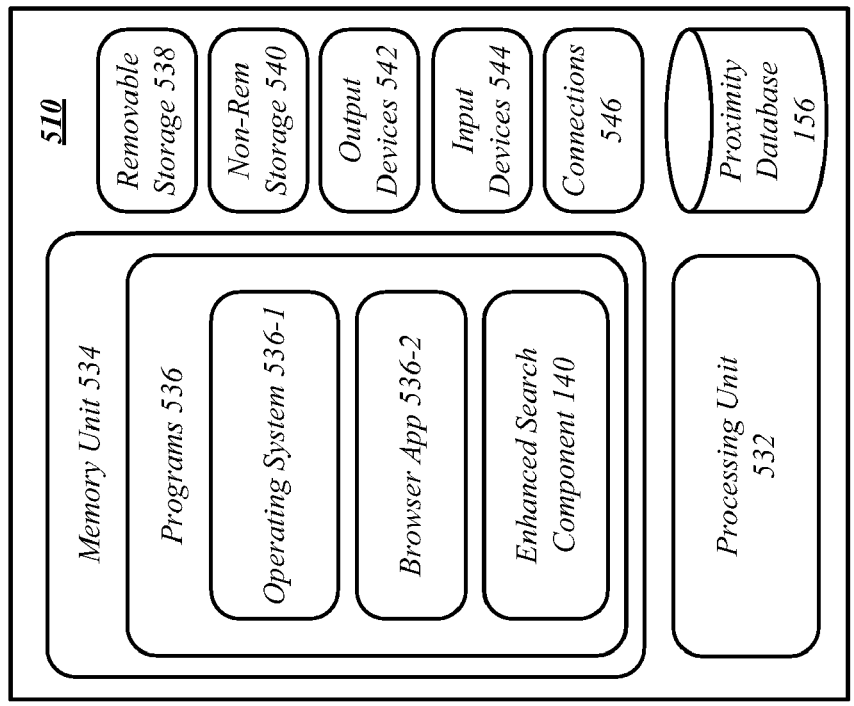
FIG. 5 illustrates an embodiment of a computing architecture.

FIG. 5 further illustrates a more detailed block diagram of computing architecture 510 suitable for implementing the computing device 110 or the server 130. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more application programs 536-1-t and accompanying data. Depending on the implementation, examples of application programs 536-1-t may include system programs such as an operating system (OS) 536-1 with appropriate GUI interface for supporting the generation of the GUI view 124, a browser application program 536-2 (e.g., web browser 112) such as MICROSOFT WINDOWS INTERNET EXPLORER®, the enhanced search component 140, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-v. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
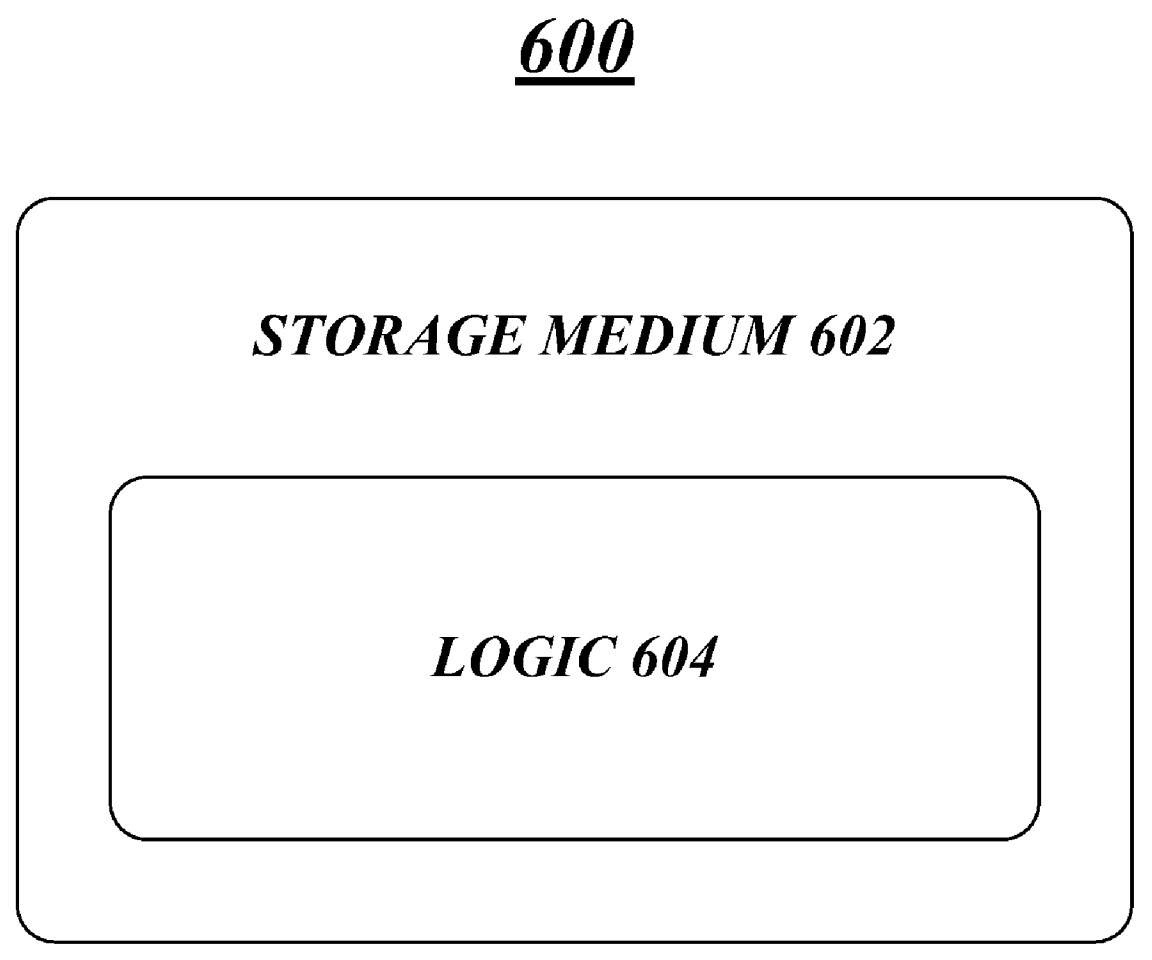

FIG. 6 illustrates a diagram an article of manufacture 600 suitable for storing logic for the various embodiments, including the logic flow 400. As shown, the article 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Figure 7:
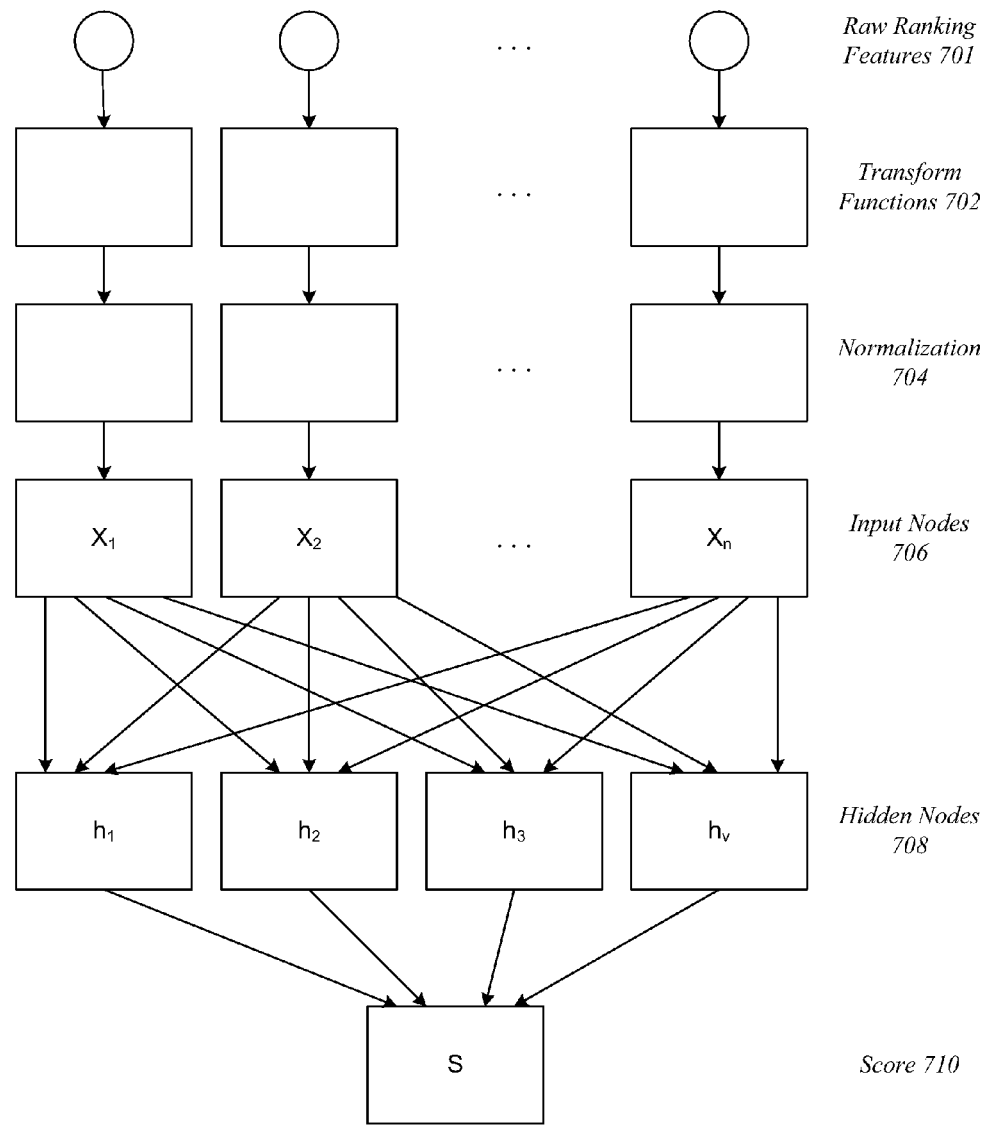
FIG. 7 illustrates an embodiment for a neural network topology.

FIG. 7 illustrates a block diagram for an exemplary topology for a neural network and supporting input nodes. As previously described, the resource ranking module 158 may utilize a relevance ranking algorithm designed as a neural network algorithm. Furthermore, the resource ranking module 158 may implement a neural network algorithm designed to rank the resources based on the proximity feature value and one or more other ranking features, such as BM25F, Click Distance, URL Depth, File Type priors, or language of the document. FIG. 7 illustrates a neural network topology and operations suitable for such a relevance ranking algorithm.

Referring to FIG. 7, the topology of an exemplary neural network configured to implement a ranking function is presented. In addition, an exemplary set of processing applied to the inputs are identified. The input processing includes a transform function layer 702 and a normalization 704 layer. The neural network itself comprises an input nodes layer 706, a hidden nodes layer 298, and score layer 710. It should be noted that the number of nodes at any layer may be modified as appropriate.

A top layer of the neural network topography may include a raw ranking features layer 701. The raw ranking features layer 701 includes the raw data values for the ranking features. These may be any of a variety of data types including numeric values, Boolean flags, character codes, labels, and so forth. These are the relevancy ranking features. The transform functions layer 702 converts the raw data values into a form more suitable for the neural network. In some cases this will convert linear data to non-linear data. In other cases it adjusts the shape of a curve. Any appropriate transformation may be used and it is not required that all inputs be transformed. In one embodiment, for example, a rational transform function such as −x/(k+x) may be used. Where the data is already in an appropriate form the transformation step may be bypassed. One example of such data is the BM25 ranking feature discussed below.

One exemplary transformation is that for Click Distance (CD). The CD is a query-independent ranking feature that measures the number of "clicks" required to reach a given page, or document, from a reference location. It takes advantage of the hierarchical structure of an intranet which usually follows a tree structure, with a root node (often the homepage) and subsequent branches extending to other nodes from that root. Viewing the tree as a graph, the CD is the shortest path between the root, as reference location, and the given page.

In its raw form, the CD increases linearly in value the further the candidate document is from the root. Typically, the greater the CD, the less relevant the document is likely to be. Therefore, the formula is used, $$\frac{1}{1+kx}$$

where x is the raw value for CD, and k is the saturation constant. This gives a value that decreases with distance rather than increasing. It has the further advantage that the value for k can be modified separately or as part of the neural network training to adjust the rate of decrease providing an additional degree of control over sensitivity to this feature.

Another exemplary transformation is that for URL Depth (UD). The UD counts the number of slashes ("/") in the Uniform Resource Locator (URL) of a network resident document. More accurately, it is how many levels deep into the storage structure (e.g., file system) the document is stored relative to a defined root level. Like CD, UD increases with depth while presumed relevance is decreasing. The same formula $$\frac{1}{1+kx}$$

is used to transform UD, but with x representing the raw value for UD and k being a distinct saturation value which is also trainable.

A further exemplary transformation is that applied to enumerated data types. One example of such a data type is file type and another is language. For any given search domain, there are a finite set of file types present and/or supported by the search engine. For example an enterprise intranet may contain word processing documents, spreadsheets, HTML web pages, and other documents. Each of these file types may have a different impact on the relevance of the associated document. An exemplary transformation will convert the single file type value into a set of binary flags, one for each supported file type. Each of these flags is then made available to the neural network individually so that each may be given a separate weight and processed separately. The language in which the document is written can be handled in a similar manner, with a single discrete binary flag used to indicate whether or not the document is written in the user's primary language.

After any required transformations are applied, the data is preferably normalized in the normalization layer 704. This technique assures that all input data has the same average value and distribution. In an exemplary embodiment, the data is normalized so that it has an expected value of 0 and a standard deviation of 1. The normalized data is then provided to the neural network input nodes layer 706. These nodes do not modify the data in any manner, but serve to distribute the data to each of the hidden nodes layer 708, as illustrated in FIG. 7.

The next operation is to process the ranking features in the neural network, beginning with the calculation of the hidden node scores. In an exemplary embodiment, each of the hidden nodes, $h_j$, calculates a linear combination of the input values using the formula:

$$h_j = \tanh\left(\left(\sum_{i=1}^{n} x_i \cdot w_{ij}\right) + t_j\right)$$

where $h_j$ is the output of hidden node j; $x_i$ is the input value from input node $w_{ij}$ is the weight to be applied to input value $x_i$ by hidden node j; and $t_j$ is the threshold value for hidden node j, and tan h( ) is the hyperbolic tangent function. Alternatively, other sigmoid functions can be used in place of tan h( ).

The overall relevance ranking score is calculated by the single node S in the scoring layer 710 of the neural network. An exemplary embodiment uses the formula:

$$\text{Score}(x_1, \ldots, x_n) = \left( \sum_{j=1}^{m} h_j \cdot w2_j \right)$$

where $h_j$ is the output of hidden node j as calculated above and $w2_j$ is the weight to be applied to hidden node output j.

An advantage of the above approach is that the final score provides a non-linear combination of the inputs (e.g., ranking features). This overcomes a disadvantage of the linear combinations which assume independence of the input variables. A clear counter example is CD and UD (defined above). These will not typically be totally independent because it is probable that as UD increases (e.g., the document is located deeper in the tree) CD will also increase as more clicks are needed to navigate the tree. Dependencies such as these can be captured using a neural network implementation of the relevance ranking function.

With the scoring process complete, the candidate documents will be rank ordered according to their relevancy score, and displayed to the user. Note that the ordering operation is not essential to the scoring of the documents but performs actual ranking ordering of the documents based on the scoring results. Similarly, display operations are not part of the ranking process but rather are a typical application of the results in the context of a search engine.

One embodiment focuses on searching for documents within an enterprise environment. That is, items located on a company intranet, internal database or similar. In this environment the documents, and the search domain itself, have characteristics which differ sufficiently from the Internet that different relevancy ranking features are needed to achieve optimal results.

One such characteristic is that the documents are far more likely to be maintained by a custodian or at least according to a standard process than is the case of the public access Internet. Because of this, documents are more likely to have associated metadata and that metadata is more likely to be accurate. This characteristic increases the utility of metadata in determining the predicted relevance of documents.

Another distinguishing characteristic is that enterprise document collections tend to be more hierarchically organized than the Internet. This is likely due to these collections being focused on the business of the enterprise in question and tending to be narrower, and deeper, than a broad, general interest collection. It is also more likely that the collection is indexed and cross referenced via hyperlinks since it is being actively maintained.

Because of the more hierarchical nature of enterprise search domains, features such as CD and UD, as defined above, become more viable predictors of relevancy. Where a collection is being actively maintained, the most relevant and authoritative documents will be the most accessible. This implies a short CD and shallow UD. The further a document is from the authoritative references, the less relevant it is likely to be. This argument is even stronger where CD is improved by using a Biased Click Distance. Briefly, Biased Click Distance provides for the CD of documents which have been identified as authoritative to be manually specified as arbitrarily low, thus improving their relevancy score, and the scores for other documents are then calculated based on their distance from these documents, rather than only from the root node.

Another ranking feature which is useful in the enterprise environment is file type. While the Internet will almost certainly contain a wider variety of file types as a raw measure, it is far more uniform as a relative measure. Because of its nature, the Internet can be expected to be dominated by web-related document types (e.g., HTML, ASP, etc.). This uniformity limits the value of file type as a relevancy predictor. On the other hand, an enterprise domain is more likely to contain a relatively high percentage of content documents and they are more likely to be retained in their native format. That is, word processing documents will remain as such, rather than being converted to HTML; a CAD file will be available in its original form, rather than being converted to a JPG image; etc. Because of this, file type will serve as an accurate predictor of document relevancy for certain types of information.

Metadata may also be a useful ranking feature in the enterprise environment. As discussed above, metadata is more likely to be complete and accurate in an enterprise. Keywords stored with the document are more likely to be drawn from the vocabulary of the enterprise business. Titles will likely be more meaningful, since they will also be related to the business of the enterprise. The language in which a document is written will be a member of a much smaller set than on the Internet. There may also be custom metadata, such as project name, department name, etc. which are usable to predict relevancy.

Another exemplary approach is to generate a ranking feature which is based on multiple document characteristics and generates a single value which is then used as an input to the neural network. One such ranking feature is known in the art as BM25. A more beneficial version of the BM25 formula is BM25F. This formula accounts for each occurrence of a term in the search query as it appears in each of several predetermined fields associated with the document being scored. Each field has its own weight and associated values (such as length) which are used to generate a field specific score for that occurrence. All field scores are combined for each term and these term scores are combined across all terms in the query to provide an overall score for each document. That overall score is then used as a relevance ranking feature by the neural network.

In one embodiment, a variation of BM25F, known as BM25G, is used. It generates the same results as BM25F but is adapted for use with neural networks. Specifically parameter b is transformed differently so that it is more convenient to take derivatives. This simplifies the task of training the neural network. The formula for BM25G is as follows:

$$BM25G(Q, D) = \sum_{t \in Q} \frac{TF'_t}{k_1 + TF'_t} \cdot \log\left(\frac{N}{n_t}\right)$$

$$TF'_t = \sum_{p \in D} TF_{t,p} \cdot w_p \cdot \frac{1 + b_p}{\left(\frac{DL_p}{AVDL_p} + b_p\right)}$$

where Q is the query string; t is an individual query term (word); D is the document being scored; p is an individual property of the document; N is the total number of documents in the search domain; $n_t$ is the number of documents containing term t; $DL_p$ is the length of the property p; $AVDL_p$ is the average length of the property p; $TF_{t,p}$ is the term t frequency in the property p; $w_p$ is the weight for the property p; $b_p$ is the length normalization for the property p; and $k_1$ is the curvature.

In the BM25G formula, p, the individual property, refers to fields associated with the document in which the individual search terms may be found. In an exemplary embodiment, the specific fields used include body, title, author, anchor text, URL display name, and extracted title. It should be noted that some of the fields (e.g., body) are part of the document itself, while others may be metadata directly associated with the document and still others (e.g., anchor text specified for a hyperlink to the document) may be metadata which is indirectly associated with the document, but stored with a different document.

One embodiment of a search engine utilizing a neural network for relevance ranking uses one or more of the above ranking features to score documents by predicted relevance. Additional features could also be used. If desired, the set of features could be tailored to the specific environment in which the search engine is used.

A neural network should be trained prior to operational use. One embodiment utilizes LambdaRank training which offers the advantage that new features can be added relatively easily to the ranking function without significantly affecting the training accuracy or training speed. As discussed above, one embodiment will also modify one or more of the values used in the transform functions as a part of the training process adding an additional degree of adaptability.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:

searching for resources in response to a search query with multiple search terms;

retrieving search term position information for each resource;

generating with a computing device a proximity feature value based on the search term position information, using an ordered cost function, wherein the ordered cost function requires search terms to be in the same order as in the search query and wherein the ordered cost function is based in part on the number of different terms in a chunk of the resource and inversely proportional to a product of a length of the chunk and a number of search terms in the search query; and ranking the resources based on the proximity feature value.

2. The method of claim 1, the search term position information to represent a position for each of the multiple search terms within a single resource.

3. The method of claim 1, the proximity feature value to represent a distance between positions for two or more of the search terms within a single resource.

4. The method of claim 1, comprising retrieving the search term position information for each resource from a proximity database.

5. The method of claim 1, comprising extracting the search term position information from each resource to retrieve the search term position information.

6. The method of claim 1, comprising generating the proximity feature value using an unordered cost function.

7. The method of claim 1, comprising generating the proximity feature value using an ordered cost function.

8. The method of claim 1, comprising ranking the resources based on the proximity feature value using a neural network algorithm.

9. The method of claim 8, comprising ranking the resources based on the proximity feature value and at least one ranking feature comprising BM25F, Click Distance, URL Depth, File Type priors, or language of the document.

10. The method of claim 1, wherein the ordered cost function is:

$$F(chunk_{properties}) = \frac{NumberofDifferentTermsInChunk}{chunk_{length} * NumberofTermsInQuery} + \frac{NumberofDifferentTermsInChunk - 1}{NumberofTermsInQuery}$$

wherein $chunk_{properties}$ represents a chunk of one of the resources, NumberofDifferentTermsInChunk is the number of different terms in the chunk, $chunk_{length}$ is the length of the chunk, and NumberofTermsinQuery is the number of terms in a search query including the one or more search terms.

11. An article comprising a storage medium containing instructions that if executed enable a system to:
search for resources in response to a search query with multiple search terms;
retrieve search term position information for each resource;
generate with a computing device a proximity feature value based on the search term position information using an ordered cost function, wherein the ordered cost function requires search terms to be in the same order as in the search query and wherein the ordered cost function is based in part on the number of different terms in a chunk of the resource and inversely proportional to a product of a length of the chunk and a number of search terms in the search query; and
rank the resources based on the proximity feature value.

12. The article of claim 11, further comprising instructions that if executed enable the system to extract the search term position information from each resource to retrieve the search term position information.

13. The article of claim 11, further comprising instructions that if executed enable the system to rank the resources based on the proximity feature value using a neural network algorithm.

14. The article of claim 11, further comprising instructions that if executed enable the system to: rank the resources using a first ranking algorithm and a first set of ranking criteria to form a first set of ranked resources; and rank a subset of the first set of ranked resources using a second ranking algorithm and a second set of ranking criteria including the proximity feature values to form a second set of ranked resources.

15. An apparatus, comprising:
at least one processor for executing computer readable instructions;
at least one computer readable medium storing the computer readable instructions that when executed by the at least one processor provide:
an enhanced search component operative to receive a search query and provide a ranked search results responsive to the search query, the enhanced search component comprising:
a resource search module operative to search for resources using multiple search terms from the search query, and output a set of resources having some or all of the search terms;
a proximity generation module communicatively coupled to the resource search module, the proximity generation module operative to receive the set of resources, retrieve search term position information for each resource, and generate a proximity feature value based on the search term position information using an ordered cost function, wherein the ordered cost function is:

$$F(chunk_{properties}) = \frac{NumberofDifferentTermsInChunk}{chunk_{length} * NumberofTermsInQuery} + \frac{NumberofDifferentTermsInChunk - 1}{NumberofTermsInQuery}$$

wherein $chunk_{properties}$ represents a chunk of one of the resources, NumberofDifferentTermsInChunk is the number of different terms in the chunk, $chunk_{length}$ is the length of the chunk, and NumberofTermsinQuery is the number of terms in a search query including the one or more search terms; and
a resource ranking module communicatively coupled to the resource search module and the proximity generation module, the resource ranking module to receive the proximity feature values, and rank the resources based in part on the proximity feature values.

16. The apparatus of claim 15, the search term position information to represent a position for each of the multiple search terms within a single resource, and the proximity feature value to represent a distance between positions for two or more of the search terms within the single resource.

17. The apparatus of claim 15, comprising a proximity database communicatively coupled to the proximity generation module, the proximity database operative to store search term position information for each resource.

18. The apparatus of claim 15, the resource ranking module operative to rank the resources using multiple ranking algorithms, the first ranking algorithm to rank the resources using a first set of ranking criteria to form a first set of ranked resources, and the second ranking algorithm to rank a subset of the first set of ranked resources using a second set of ranking criteria including the proximity feature values to form a second set of ranked resources.

* * * * *